A. B. COLVER & J. PRIEST.
Cultivators.
No. 135,264. Patented Jan. 28, 1873.
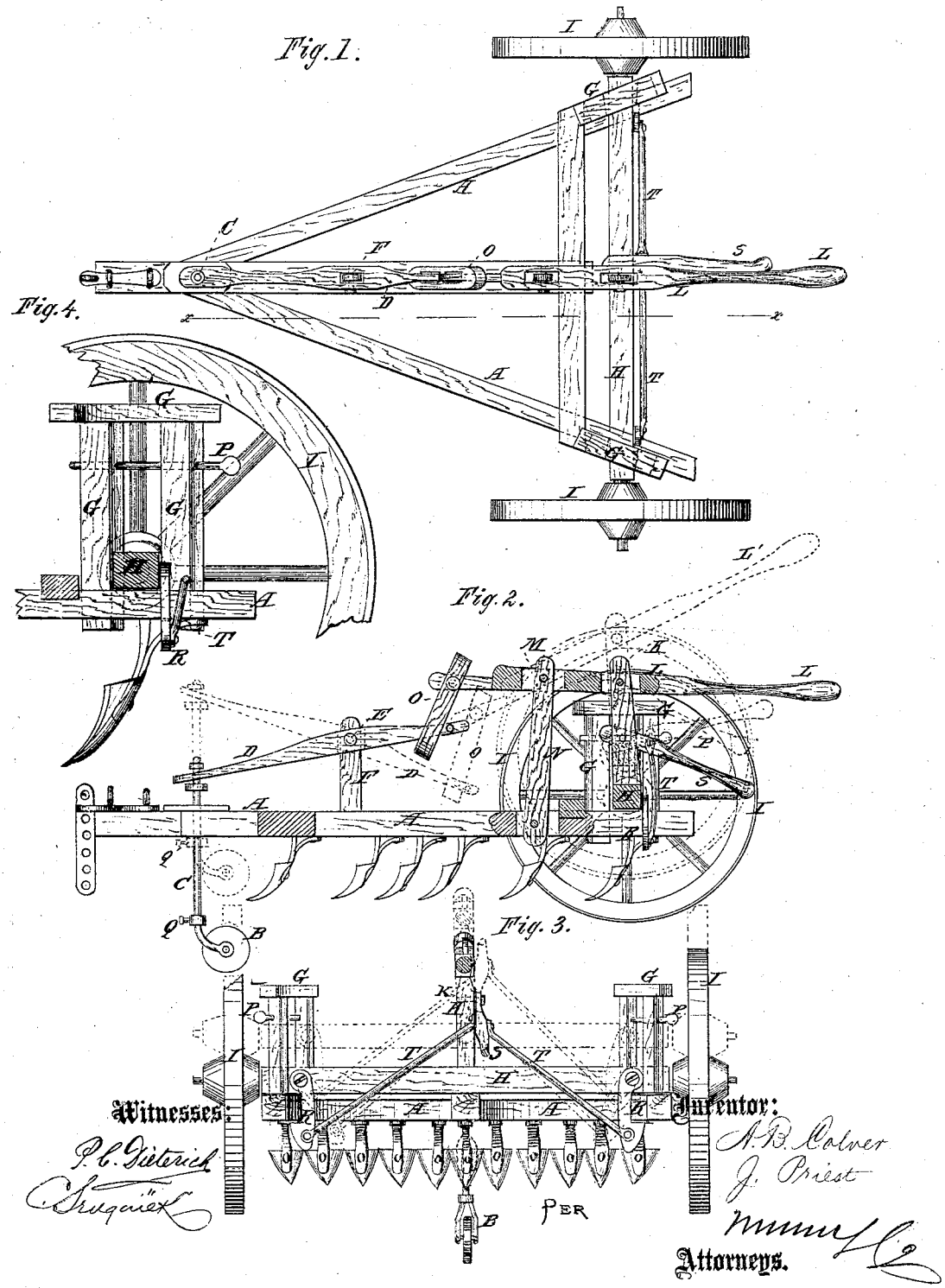

UNITED STATES PATENT OFFICE.

AMOS B. COLVER AND JOHN PRIEST, OF ALBANY, OREGON.

IMPROVEMENT IN CULTIVATORS.

Specification forming part of Letters Patent No. 135,264, dated January 28, 1873.

*To all whom it may concern:*

Be it known that we, AMOS B. COLVER and JOHN PRIEST, of Albany, in the county of Lynn and State of Oregon, have invented a new and Improved Cultivator, of which the following is a specification:

Our invention consists of a triangular cultivator with an adjustable device for varying the depth of its furrows by shifting it and maintaining it at different heights on a truck of two wheels at the rear and a caster-wheel at the front; also for raising it above the ground and supporting it for moving it on the road, the adjusting apparatus being arranged as hereinafter described.

Figure 1 is a plan view. Fig. 2 is a longitudinal sectional elevation taken on the line $x\ x$ of Fig. 1. Fig. 3 is a rear elevation. Fig. 4 is a view of some of the parts shown in Fig. 2 on an enlarged scale.

A is a frame for the cultivator. B is a caster-wheel at the front, with a spindle, C, extending up through the frame and attached to a lever, D, pivoted near its center at E to a standard, F, the frame being capable of rising and falling on the spindle. At the rear end a housing-frame, G, is erected on the top of the frame A at each side, with the axle H of a pair of truck-wheels, I, between the housings. The axle has a standard, K, extending up from its center to and connected with a lever, L, which is pivoted at M, in front of the standard K, to a standard, N, pivoted both to the frame and the said lever L, which projects a short distance forward of standard N, and connects, by a link, O, with the rear end of lever D, the other end, L, projecting behind the axle conveniently for being manipulated by the attendant in shifting the cultivator. This end of the lever is raised, as indicated by the dotted lines L', to allow the cultivator to descend both on the truck and the caster. The amount of the descent is limited by the pins P passing through the housings above the axle, and by an adjustable collar, Q, on the caster-spindle. By shifting the pins higher or lower in the holes provided for them, and shifting the collar to different positions on the caster-spindle, the cultivator is regulated as to the depth it enters the ground.

To support the cultivator entirely above the ground, the pins are placed in the uppermost holes in the housings, the lever I is shifted to its lowermost limits, and the hooks R on the axle are caused to swing under the frame and engage it by shifting the lever S downward, to which they are connected by rods T, said lever being pivoted at one end to the standard K, and projecting at its free end behind the truck, to be actuated by the attendant. The weight of this lever and the rods keep the hooks engaged with the frame, and they support the rear end; at the same time the collar Q is adjusted on the rod C so as to hold the front end of the cultivator at the uppermost range on the caster rod or spindle.

The dotted lines in Figs. 2 and 3 indicate the position of the adjusting devices and the truck when the cultivator is at work. The full lines represent the position when the cultivator is adjusted for being transported above the ground.

Having thus described our invention, we claim as new and desire to secure by Letters Patent—

1. The combination, with the cultivator, the truck, and the caster, of the housings, the levers D L, standards F K N, the connecting-link O, the pins P, and the adjustable collar Q, substantially as specified.

2. The combination of the hooks R, rods T, and lever S with the truck and cultivator, substantially as specified.

AMOS B. COLVER.
JOHN PRIEST.

Witnesses:
J. H. HACKLEMAN,
A. C. JONES.